United States Patent
Batra et al.

(10) Patent No.: US 7,583,976 B2
(45) Date of Patent: Sep. 1, 2009

(54) METHOD AND APPARATUS FOR TRANSMIT POWER CONTROL IN WIRELESS DATA COMMUNICATION SYSTEMS

(75) Inventors: Anuj Batra, Dallas, TX (US); Srinivas Lingam, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 600 days.

(21) Appl. No.: 11/380,075

(22) Filed: Apr. 25, 2006

(65) Prior Publication Data
US 2007/0099644 A1   May 3, 2007

Related U.S. Application Data

(60) Provisional application No. 60/675,193, filed on Apr. 26, 2005.

(51) Int. Cl.
*H04B 7/00* (2006.01)
*H04Q 7/20* (2006.01)
(52) U.S. Cl. ............... 455/522; 455/69; 455/127.1
(58) Field of Classification Search .......... 455/522, 455/69, 127.1, 67.11, 226.1
See application file for complete search history.

(56) References Cited

U.S. PATENT DOCUMENTS

| | | | |
|---|---|---|---|
| 6,490,460 B1 * | 12/2002 | Soliman ............... 455/522 |
| 6,741,862 B2 * | 5/2004 | Chung et al. ........... 455/63.1 |
| 6,795,424 B1 * | 9/2004 | Kapoor et al. .......... 370/343 |
| 6,845,246 B1 * | 1/2005 | Steer .................... 455/522 |
| 6,879,840 B2 | 4/2005 | Razavilar et al. | |
| 6,940,827 B2 | 9/2005 | Li et al. | |
| 2003/0104831 A1 * | 6/2003 | Razavilar et al. ........ 455/522 |

* cited by examiner

*Primary Examiner*—Tilahun Gesesse
(74) *Attorney, Agent, or Firm*—Steven A. Shaw; W. James Brady; Frederick J. Telecky, Jr.

(57) ABSTRACT

The distance between a first Multi Band Orthogonal Frequency Division Multiplex (MB-OFDM) data transceiver and a second or more such transceiver is determined using known techniques. The radio frequency path loss between transceivers is estimated given said distance, using a known relationship between distance and path loss, and further accounting for line-of-sight or non-line-of-sight conditions if desired. This path loss value is added to the typically minimum transmit power level, absent path loss, needed for reliable data communication. This modified initial transmit power level is then used by the first transceiver to begin the known iterative feedback process of transmit power control (TPC). Because this modified initial transmit power level, based on distance, is closer to the final optimum level, convergence in the TPC process occurs in fewer steps and less time than had the initial transmit power been maximum power as is typical in known TPC systems.

8 Claims, 4 Drawing Sheets

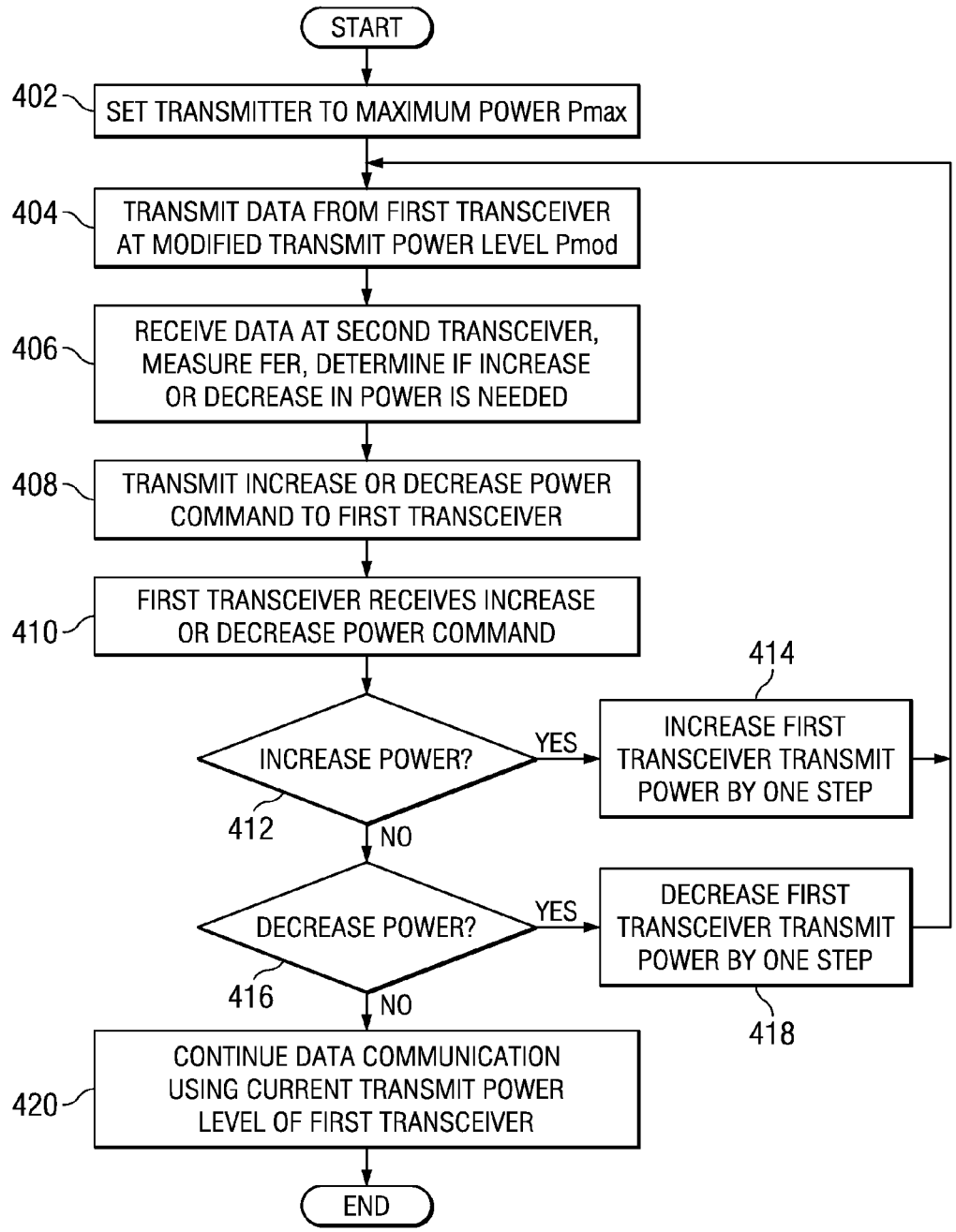

METHOD AND APPARATUS FOR TRANSMIT POWER CONTROL IN WIRELESS DATA COMMUNICATION SYSTEMS

BACKGROUND OF THE INVENTION

1. Field of the Invention

This invention relates generally to wireless data communication, and, in particular, to transmit power control by which an optimal transmitter power is determined that is high enough to enable reliable communication while low enough to minimize interference to other users or devices sharing the same spectrum.

2. Description of the Related Art

In wireless data communication systems, it is often beneficial to employ transmit power control (TPC), limiting the transmit power to a level high enough for reliable communication but typically less than the maximum available power. Benefits include but are not limited to reduced transmitter power drain—especially important in battery-powered applications—and reduced interference to other users of the same spectrum. In some systems such as ultra wideband (UWB), concurrent users share all or a portion of the spectrum used by other users' transmissions.

TPC is widely used in cellular telephone systems and wireless data communication systems utilizing unlicensed spectrum, such as that system commonly referred to as Wi-Fi. In communication systems utilizing spread-spectrum modulation, minimizing the transmit power is especially important, as multiple transceivers in an area share common spectrum. The effectiveness of communication between devices may be reduced considerably if one or more transmitters in the area are transmitting at significantly higher power than the other transmitters. TPC is typically implemented as an iterative process converging on an optimal transmit power, wherein a first transceiver transmits a first data packet at a high level, typically maximum power. If a second transceiver is within range, it receives this transmission and computes a figure of merit, such as frame error rate (FER), which is related to received signal power. This figure of merit is compared in the second data transceiver to desired limits, and a command to increase power or decrease power is transmitted back to the first data transceiver. The first data transceiver then typically raises or lowers power in a stepwise manner, or according to another power level progression. Another data packet is then sent to the second transceiver, using this modified transmit power, and a new figure of merit is computed and compared to desired limits, causing another increase or decrease power command to be sent to the first transceiver. In this iterative manner, a transmit power level for the first transceiver is found which generates the desired figure of merit in the second transceiver. Measurement of the figure of merit may continue as the payload data transfer occurs, so that the iterative process of adjusting transmit power may be repeated if the figure of merit deviates from the prescribed range. In typical systems, the transmit power levels in both transceivers are adjusted in this manner, either concurrently or sequentially.

The iterative process described above typically requires multiple bidirectional data exchanges to arrive at optimal transmit power levels for each transceiver. These data exchanges add undesired overhead to the communication link, putting additional drain on the power source in each transceiver, and lengthening the time each transmitter is on the air and thus potentially interfering with other transceivers in the area. A method and apparatus for optimizing this process so as to more rapidly determine an optimal transmit power is therefore desirable.

SUMMARY OF THE INVENTION

The invention provides an apparatus and method for estimating, based on distance between transmitter and receiver, an initial transmit power close to an optimal level, thereby minimizing the number of additional iterative steps required to reach an optimal transmit power level.

In a preferred embodiment of the invention described in greater detail below, the initial transmit power of a first transceiver is determined in part by the distance between the first and a second or more data transceiver. This distance or range is computed in some data communication systems by measuring the propagation time of a data packet from the first transceiver to the second or more transceiver and back. Because radio waves travel at a nearly constant velocity in air, this round-trip propagation time correlates well to the distance between the transceivers. An example of ranging capability in an Ultra Wideband (UWB) wireless system is described in standard ECMA-368 and in Texas Instruments patent T37034 on UWB ranging for MB-OFDM systems. In some UWB systems including Multi-Band Orthogonal Frequency Division Multiplex (MB-OFDM) systems, the data packets used for ranging support desired functions such as limiting association, whereby data communication is limited to transceivers within a certain distance of each other. Because ranging is typically already occurring for such desired functions, its use for the disclosed invention typically adds no additional overhead.

The reduction in received signal strength as the distance between transceivers increases is well understood theoretically and is readily determined empirically. This loss in received signal strength attributable to the distance between transceivers is typically referred to as path loss.

By measuring the distance between transceivers, and estimating the path loss based on this distance, an initial transmit power level may be determined which is closer to the optimum value. This is done by adding the estimated path loss to the known typically lowest transmit power level which yields reliable data transfer with minimal or no path loss. Further refinement of transmit power level may then occur using the known iterative closed-loop method described above, wherein the receiver in the second or more transceiver commands the transmitter in the first transceiver to increase or decrease power based on a receiver figure of merit such as FER. Convergence to the optimal transmit power thus occurs more rapidly when the initial transmit power level is based on distance and estimated path loss, rather than if the initial transmit power had been maximum power or some other arbitrary value. In some cases, the initial transmit power is close enough to the optimum that no further iteration is required.

Further benefits and advantages will become apparent to those skilled in the art to which the invention relates.

DESCRIPTION OF THE VIEWS OF THE DRAWINGS

FIG. 4 is a flow chart showing the iterative process of transmit power control in a known system.

Throughout the drawings, like elements are referred to by like numerals.

DETAILED DESCRIPTION

Figure 1:
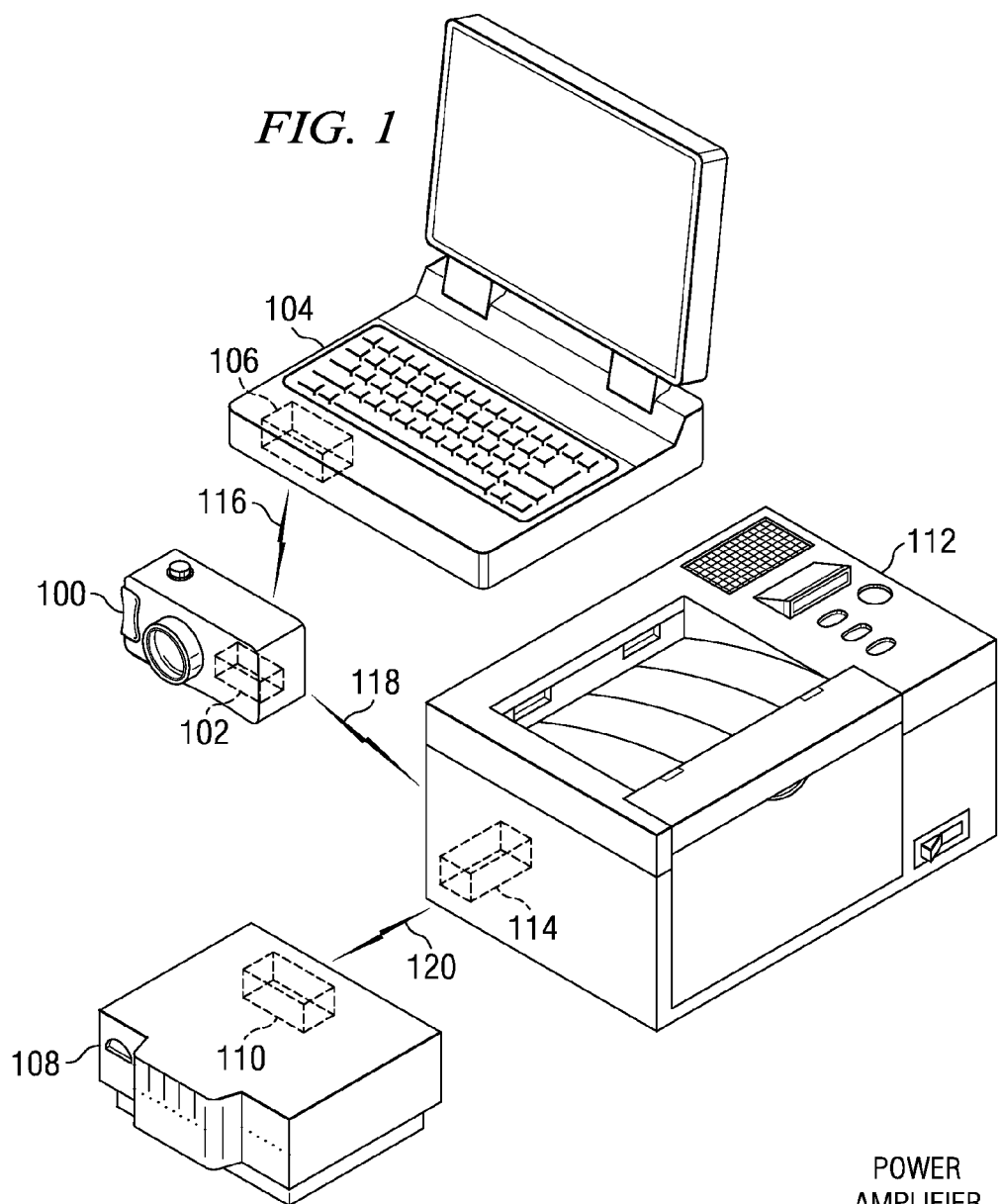
FIG. 1 is a diagram of a wireless data communication system having wide variation in the distance (range) between multiple transceivers, in which transceivers have distance measurement (ranging) and transmit power adjustment capabilities.

As shown in FIG. 1, a digital camera 100 has within it a digital data transceiver 102 which enables wireless transfer of image files from camera 100 to computer 104 having data transceiver 106. In this example the distance 116 between camera 100 and computer 104 is small compared to distance 118 between camera 100 and television 112. Television 112 has within or coupled to it data transceiver 114 which enables camera 100 to display images on television 112 without physically connecting the two. DVD player 108 having transceiver 110 is next to television 112, and transmits video and audio from transceiver 110 in DVD player 108 to transceiver 114 in television 112. As the DVD player and television are in close proximity in this example, distance 120 is small compared to distance 118.

Within each transceiver 102, 106, 110, 114 are circuits which determine distances between transceivers, and transmit power control circuitry responsive both to this path distance and to an increase or decrease power command sent to the transmitting transceiver by the receiving transceiver. The increase or decrease power decision is made in the receiving transceiver based on a figure of merit representative of data communication quality, such as frame error rate (FER). These circuits are detailed in FIG. 2.

In a scenario such as one in which DVD player 108 is transmitting a movie to television 112 over a short distance 120 concurrent with camera 100 transmitting images to television 112 over a much longer distance 118, it is important that the transmit power utilized by transceiver 110 is less than the transmit power utilized by transceiver 102, so as to make approximately equal the signal levels from both the camera and the DVD player at television 112. If the transmit power of DVD player 108 were significantly higher than that of camera 100, the higher level signal would likely cause interference with the lower level signal, resulting in data errors or failure to establish communication between camera 100 and television 112. However, when each transceiver has knowledge of distance between itself and others, and is able to adjust it's transmit power accordingly, such interference is significantly reduced.

Figure 2:
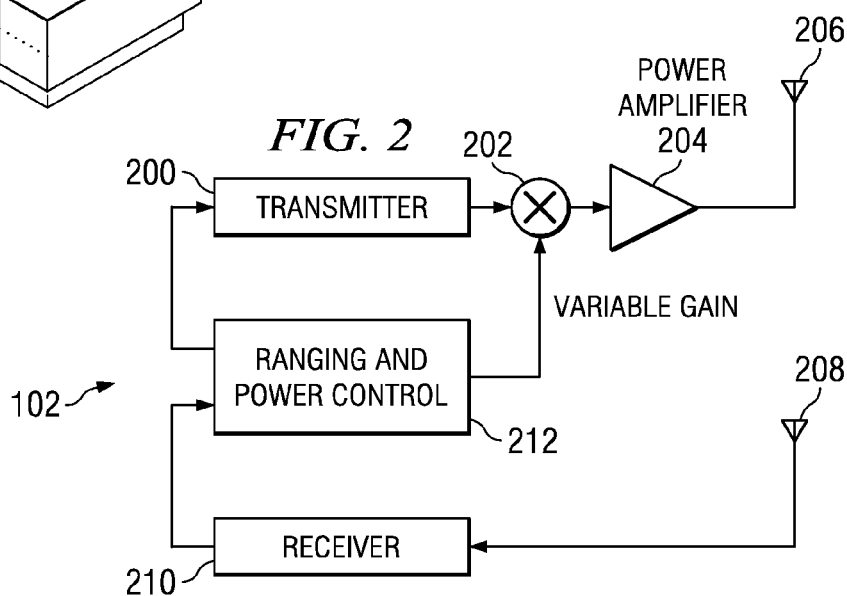
FIG. 2 is a block diagram of a data transceiver having distance measurement (ranging) and transmit power adjustment capabilities.

In FIG. 2, further detail of the transceiver 102 and TPC subsystem of the preferred embodiment is shown. Functional elements of FIG. 2 may be realized in hardware, software, or some combination, as will be obvious to those skilled in the art.

Transmitter 200 facilitates modulation of a data signal onto a carrier of appropriate frequency using an appropriate modulation scheme. The output of transmitter 200 is coupled through variable gain 202 to power amplifier 204, which in turn is coupled to transmit antenna 206. Receive antenna 208 is coupled to receiver 210, which demodulates and decodes received data. Ranging and power control 212 measures the time delay from transmission by transmitter 200 to receipt of an acknowledgement from a second or more transceiver, and facilitates computation of the distance (range) between transceiver 102 and this second or more transceiver. Ranging and power control 212 also facilitates estimation of path loss based on this distance, and couples a control signal responsive to this path loss to variable gain 202, thereby modifying the transmitted power to approximate the optimal power for the measured distance.

Given a first and a second transceiver, wherein T1 is the time of transmission by the first transceiver of a first data packet, R2 is the time of receipt by the second transceiver of this first data packet, T2 is the time of subsequent transmission of an acknowledging second data packet by the second transceiver, R1 is the time of receipt by the first transceiver of this second data packet, and C is the speed of light in meters per second, the distance D between the first and second transceivers, compensating for known processing delays in the transceivers, is given by:

$$D=C*[(R2-T1)+(R1-T2)]/2$$

Ranging and power control 212 is also coupled to data from receiver 210, such that it may receive commands from the second transceiver to increase or decrease power as needed. The transmitted power from transceiver 102 is thus initially at a substantially optimal level based on measured range between the transceivers, and is then iteratively refined if necessary, responsive to power increase or decrease commands from the second or more transceiver.

Figure 3:
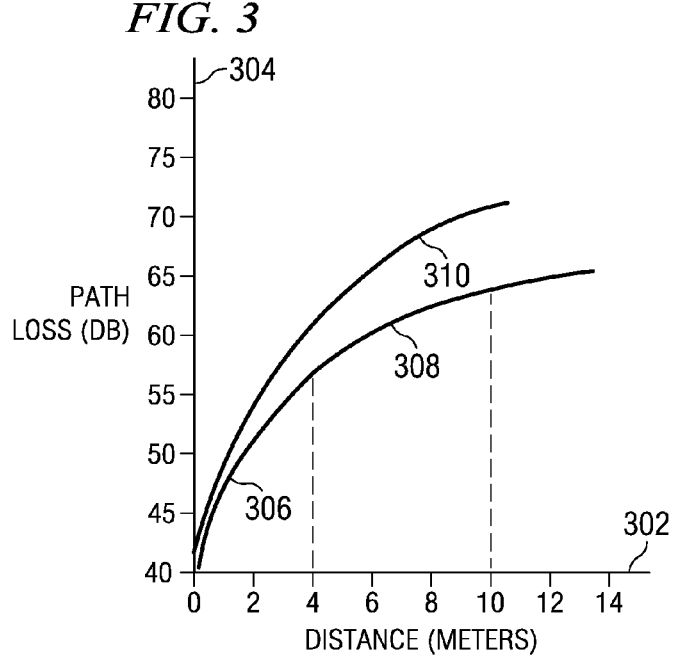
FIG. 3 is a known graph of path loss as a function of distance between two transceivers.

FIG. 3 graphically shows the known relationship between distance between transceivers and path loss. Horizontal axis 302 represents distance in meters between the two transceivers. Vertical axis 304 represents path loss. Line segments 306 and 308, taken together, show the functional relationship between distance and path loss. This relationship is contained within ranging and power control 212, typically as an algorithm or a lookup table, and is used by ranging and power control 212 to determine approximate path loss between transceivers once range between transceivers is determined. In an embodiment using an algorithm to calculate path loss, different path loss functions or parameters may be used for different distance ranges. For example, the function may have path loss increasing as the square of distance for distance from 0 to 4 m, as shown by segment 306, and path loss increasing by the cube of distance for distance from 4 to 10 m, as shown by segment 308. Further refinement of the relationship between distance and path loss may be made if additional information is available, such as whether the path is line-of-sight (LOS) or non-line-of-sight (NLOS). Some transceivers, such as ultra wideband systems using multi-band OFDM or spread spectrum modulation, are able to determine in a known manner the LOS or NLOS nature of the path they are using. Line segments 306 and 308 represent a typical LOS path loss relationship, while line segment 310 represents a typical NLOS path having higher path loss than the LOS path at a given distance.

In FIG. 4, a flow chart shows the steps used by a typical known iterative closed loop transmit power control system.

At step 402, the transmitter in the first data transceiver is set to maximum power in preparation for its initial communication with a second or more transceiver an unknown distance away.

At step 404, the initial data transmission from the first transceiver is made at maximum power. Subsequent data transmissions are made at a modified transmit power level.

At step 406, data from the first transceiver is received at the second or more transceiver, which computes a figure of merit for data quality, such as frame error rate (FER), and based on this figure of merit, determines whether the received power level needs to be increased or decreased.

At step 408, an "increase power" or "decrease power" command is transmitted back to the first data transceiver.

At step 410, the first transceiver receives the command to increase or decrease transmit power level.

At step 412, if the received command was to increase power, in step 414 the first transceiver power level is increased by one step, and process flows to start of step 404. If there was no command to increase power, flow continues to step 416.

At step 416, if the received command was to decrease power, in step 418 the first transceiver power level is decreased by one step, and process flows to start of step 404. If there was no command to decrease power, flow continues to step 420.

At step 420, TPC is complete, and data communication begins using the current transmit power level.

Figure 5:
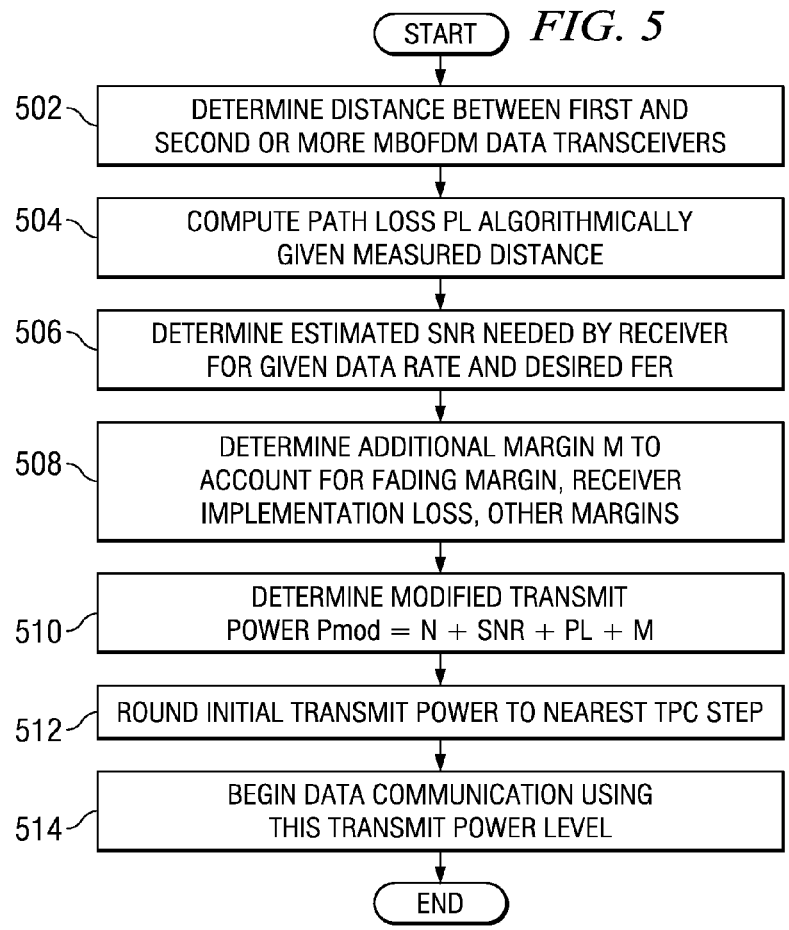
FIG. 5 is a flow chart showing the steps used in the preferred embodiment to determine an initial transmit power level nearer the optimal transmit power level.

In FIG. 5, a flow chart describes the steps of the method of the preferred embodiment, wherein the initial transmit power level is based on distance between transceivers.

At step 502, the distance between a first MB-OFDM transceiver and a second transceiver is measured using known techniques such as specified in ECMA-368 and described in Texas Instruments patent T37034 on UWB ranging for MB-OFDM systems.

At step 504, this measured distance is input to an algorithm to determine approximate path loss (PL) for the distance. The algorithm may also account for path characteristics in addition to distance, such as LOS or NLOS.

At step 506, the signal to noise ratio (SNR) desired at the receiver is estimated, based on the known packet data rate. This SNR, when added to the noise power N, approximates the minimum received signal level needed to receive data with a given frame error rate in the absence of fading or other path impairments.

At step 508, an additional margin M is determined, dependent on characteristics of the system and the desired level of certainty of communication, where M is the sum of such parameters as fading margin (typically on the order of 3 dB), receiver implementation loss (typically on the order of 2.5 dB), and any other margins (typically on the order of 3 dB).

At step 510, the initial transmit power level Pmod is determined, where:

$$Pmod=N+SNR+PL+M.$$

At step 512, this initial transmit power level is rounded to the nearest TPC step.

At step 514, data communication begins at this rounded initial transmit power level.

Figure 6:
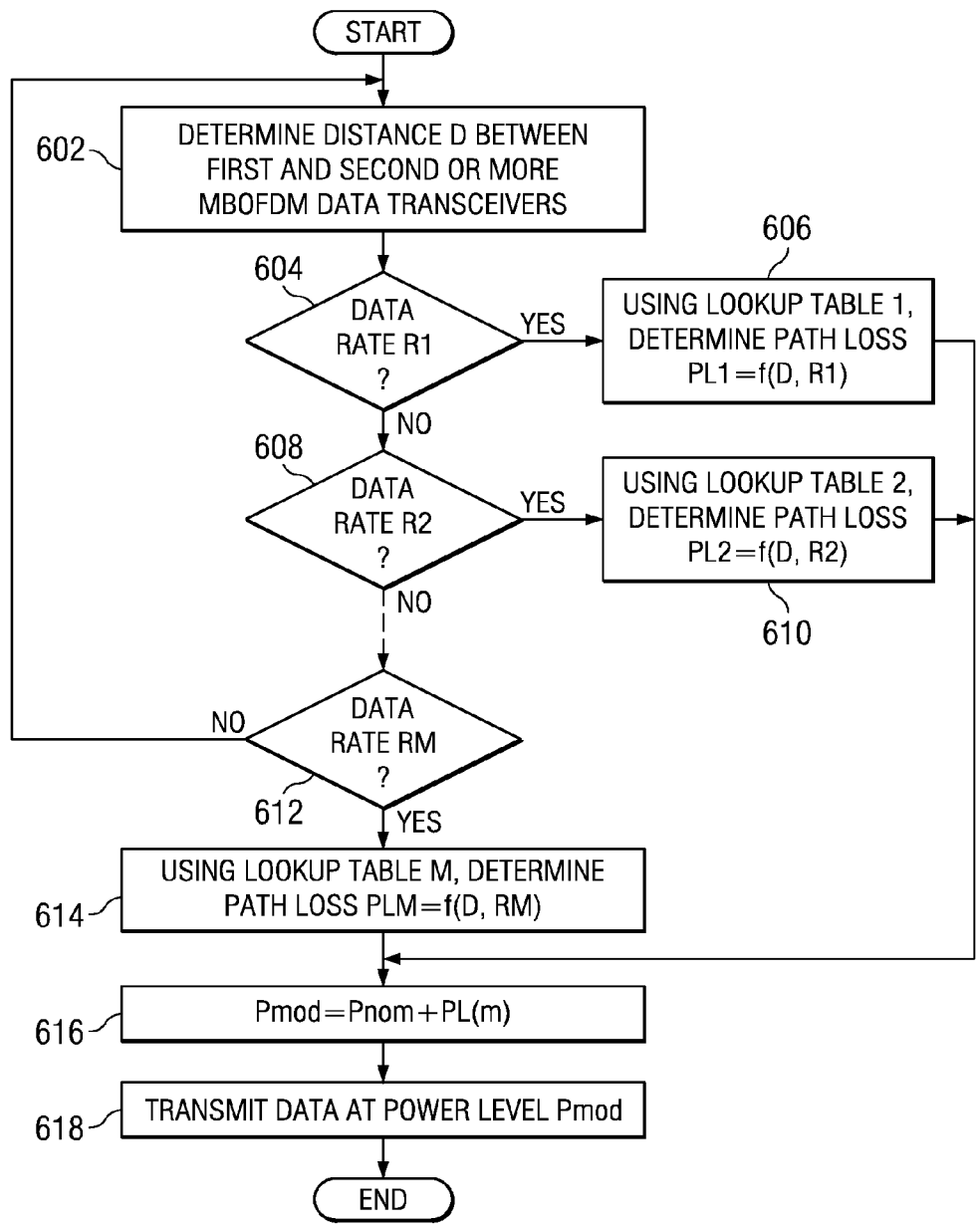
FIG. 6 is a flow chart showing the steps used in another embodiment to determine an initial transmit power level nearer the optimal transmit power level.

In FIG. 6, a flow chart describes the steps of the method of yet another embodiment, wherein a nominal transmit power Pnom is modified by a combination of transmit data rate and distance between transceivers. Pnom is that transmit power level which, for a given data rate (for example, the lowest data rate of a plurality of possible data rates to be supported) and distance (for example, the shortest distance of a range of distances to be supported), results in reliable data communication accounting for desired margins for fading, receiver implementation loss, receiver SNR requirements, and other margins. In this embodiment, since transmit power needs to increase as data rate increases, and also needs to increase as distance increases, Pnom represents the typically lowest transmit power level to be used. By knowing the actual data rate and distance, a gain value may be determined which modifies Pnom such that margins are retained and reliable data communication is enabled.

At step 602, the distance D between a first MB-OFDM transceiver and a second or more transceiver is measured using known techniques such as specified in ECMA-368.

At step 604, a test of data rate is made, to determine if the transmitted data rate is at rate R1, the first of M possible data rates to be used by the system. If yes, flow proceeds to step 606. If no, flow proceeds to step 608.

At step 606, path loss as a function of distance D and data rate R1 is determined using a first lookup table. The resulting path loss PL1 is passed to step 616.

At step 608, a test of data rate is made, to determine if the transmitted data rate is at rate R2. If yes, flow proceeds to step 610. If no, flow proceeds to step 612.

At step 610, path loss as a function of distance D and data rate R2 is determined using a second lookup table. The resulting path loss PL2 is passed to step 616.

At step 612, a test of data rate is made, to determine if the transmitted data rate is at rate RM. If yes, flow proceeds to step 614. If no, flow proceeds to step 602 or alternatively to an error handling process.

At step 614, path loss as a function of distance D and data rate RM is determined using the Mth lookup table. The resulting path loss PLM is passed to step 616.

At step 616, the nominal transmit power level Pnom is increased by PL(m), such that Pmod=Pnom+PL(m), where m is one of 1, 2, . . . M.

At step 618, data communication occurs at this modified transmit power level Pmod.

It is apparent to those skilled in the art that additional lookup tables accounting for other variables such as LOS/NLOS can be employed, and/or that lookup tables may be replaced or augmented by appropriate algorithms for generating the PL(m), without deviating from the spirit of the invention.

Those skilled in the art to which the invention relates will appreciate that yet other substitutions and modifications can be made to the described embodiments, without departing from the spirit and scope of the invention as described by the claims below.

What is claimed is:

1. A method for controlling the transmit power of a first data transceiver, comprising:

determining the distance between said first data transceiver and a second or more such transceiver with which communication is to occur;

determining the approximate radio frequency path loss expected given said distance between transceivers; and adjusting the transmit power of said first data transceiver responsive to said path loss so as to transmit at a modified power level substantially as low as possible while still enabling reliable data communication comprising:

transmitting, at said modified power level, a first data packet from said first data transceiver to said second or more data transceiver;

receiving said first data packet in said second or more data transceiver;

computing in said second or more data transceiver a figure of merit indicative of quality of the data received by said second or more data transceiver;

comparing in said second or more data transceiver said figure of merit with desirable limits for said figure of merit;

determining in said second or more data transceiver, responsive to said comparing step, whether an increase or decrease in transmit power level from said first data transceiver would improve said figure of merit;

transmitting from said second or more data transceiver to said first data transceiver a command to increase or decrease as appropriate the transmit power level of said first data transceiver;

modifying in said first data transceiver the transmit power level responsive to said command from said second or more data transceiver; and repeating the above process as needed to optimize the transmit power level of said first data transceiver.

2. A method for controlling the transmit power of a first Multi Band Orthogonal Frequency Division Multiplex (MB-OFDM) data transceiver, comprising:

determining the distance between a first Multi Band Orthogonal Frequency Division Multiplex (MB-OFDM) data transceiver and a second or more such transceiver with which communication is to occur;

determining the approximate radio frequency path loss PL expected given said distance between said transceivers;

determining, by a known relationship between signal to noise ratio (SNR) and data rate, the approximate SNR desired for reliable reception of data at said known data rate;

determining additional margin M desired for reliable communication at a desired FER, where M may include but is not limited to the sum of fading margin, implementation loss for the receiver, and other margins;

determining the estimated modified transmit power level Pmod, which is that lowest level that allows successful reception and decoding of the data packet in a channel having noise power N, by summing said noise power N, said SNR, said margin M, said path loss PL, and said margin M;

rounding said estimated modified transmit power level Pmod to the nearest achievable transmit power level; and using this rounded transmit power level as the initial starting power level for the known closed loop TPC process.

3. The method of claim 2, wherein determining the approximate radio frequency path loss expected given said distance between said transceivers uses an algorithm relating said distance and said path loss.

4. The method of claim 2, wherein determining the approximate radio frequency path loss expected given said distance between said transceivers uses a plurality of algorithms relating said distance and said path loss, choosing one of said algorithms based on determination by known methods as to whether line-of-sight or non-line-of-sight path conditions are present.

5. The method of claim 4, wherein said algorithm subdivides the distance between said transceivers into a plurality of ranges, and applies different mathematical functions to each said range.

6. The method of claim 2, wherein determining the approximate radio frequency path loss expected given said distance between said transceivers uses a lookup table relating said distance and said path loss.

7. The method of claim 2, wherein determining the approximate radio frequency path loss expected given said distance between said transceivers uses a plurality of lookup tables relating said distance and said path loss, choosing one of said tables based on determination by known methods as to whether line-of-sight or non-line-of-sight path conditions are present.

8. A method for controlling the transmit power of a first data transceiver, comprising:

determining the distance between said first data transceiver and a second or more such transceiver with which communication is to occur;

determining the approximate radio frequency path loss expected given said distance between transceivers; and adjusting the transmit power of said first data transceiver responsive to said path loss so as to transmit at a modified power level substantially as low as possible while still enabling reliable data communication, comprising:

determining the distance D between a first Multi Band Orthogonal Frequency Division Multiplex (MB-OFDM) data transceiver and a second or more such transceiver with which communication is to occur;

determining the data rate R(M) of the data to be transmitted;

utilizing lookup table M from a multiplicity of lookup tables, determining the path loss PL(M) as a function of both distance D and data rate R(M), wherein the lookup table values are chosen to account also for fading margin, receiver implementation loss, other margin, and other factors such as LOS or NLOS conditions;

adding PL(M) to a nominal transmit power level Pnom, where Pnom is typically that lowest power level known to facilitate reliable data communication at a nominal data rate, such as but not limited to the lowest data rate, and at a nominal distance, such as but not limited to the shortest distance; and transmitting data using this modified transmit power level Pmod.

* * * * *

UNITED STATES PATENT AND TRADEMARK OFFICE
CERTIFICATE OF CORRECTION

PATENT NO. : 7,583,976 B2 Page 1 of 1
APPLICATION NO. : 11/380075
DATED : September 1, 2009
INVENTOR(S) : Batra et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 729 days.

Signed and Sealed this

Fourteenth Day of September, 2010

David J. Kappos
*Director of the United States Patent and Trademark Office*